Jan. 9, 1951 E. J. RIMPLE 2,537,913
MATERIAL DISTRIBUTOR
Filed Oct. 6, 1947 3 Sheets-Sheet 1

INVENTOR.
E. J. Rimple
BY
ATTYS

Jan. 9, 1951  E. J. RIMPLE  2,537,913
MATERIAL DISTRIBUTOR
Filed Oct. 6, 1947  3 Sheets-Sheet 3

INVENTOR.
E. J. Rimple
BY
ATTYS

Patented Jan. 9, 1951

2,537,913

UNITED STATES PATENT OFFICE 2,537,913

MATERIAL DISTRIBUTOR

Edward J. Rimple, Santa Clara, Calif., assignor to Rimple Manufacturing Co., Santa Clara, Calif., a corporation of California Application October 6, 1947, Serial No. 778,230

5 Claims. (Cl. 275—8)

The present invention has for one object the provision of a novel, power actuated distributor for commercial fertilizers, grain, seeds or the like, as used agriculturally. The device is adapted to be mounted on, and driven by, a vehicle such as a tractor or truck, or trailer with an auxiliary engine.

Another object of the invention is to provide a fertilizer and seed distributor of improved, rotary-impeller type; the device including a pair of impellers and a novel pulley and endless belt driving unit for the same. This pulley and endless belt unit is arranged so that such impellers are simultaneously driven from the belt but turn in opposite directions as is necessary to lateral distribution on both sides, as well as to the rear, of the vehicle.

An additional object is to provide the hopper assembly with control gate units, corresponding to the impellers, which are of greatly improved construction and operation; said gate units being designed so that the feed port of each can be adjusted circumferentially relative to the corresponding impeller, which is desirable for effective and proper distribution of material of different weights.

A further object of the invention is to provide a practical and reliable fertilizer and seed distributor, and yet one which will be exceedingly effective for the purpose for which it is designed.

These objects are accomplished by means of such structure and relative arrangement of parts as will fully appear by a perusal of the following specification and claims.

Figure 1:
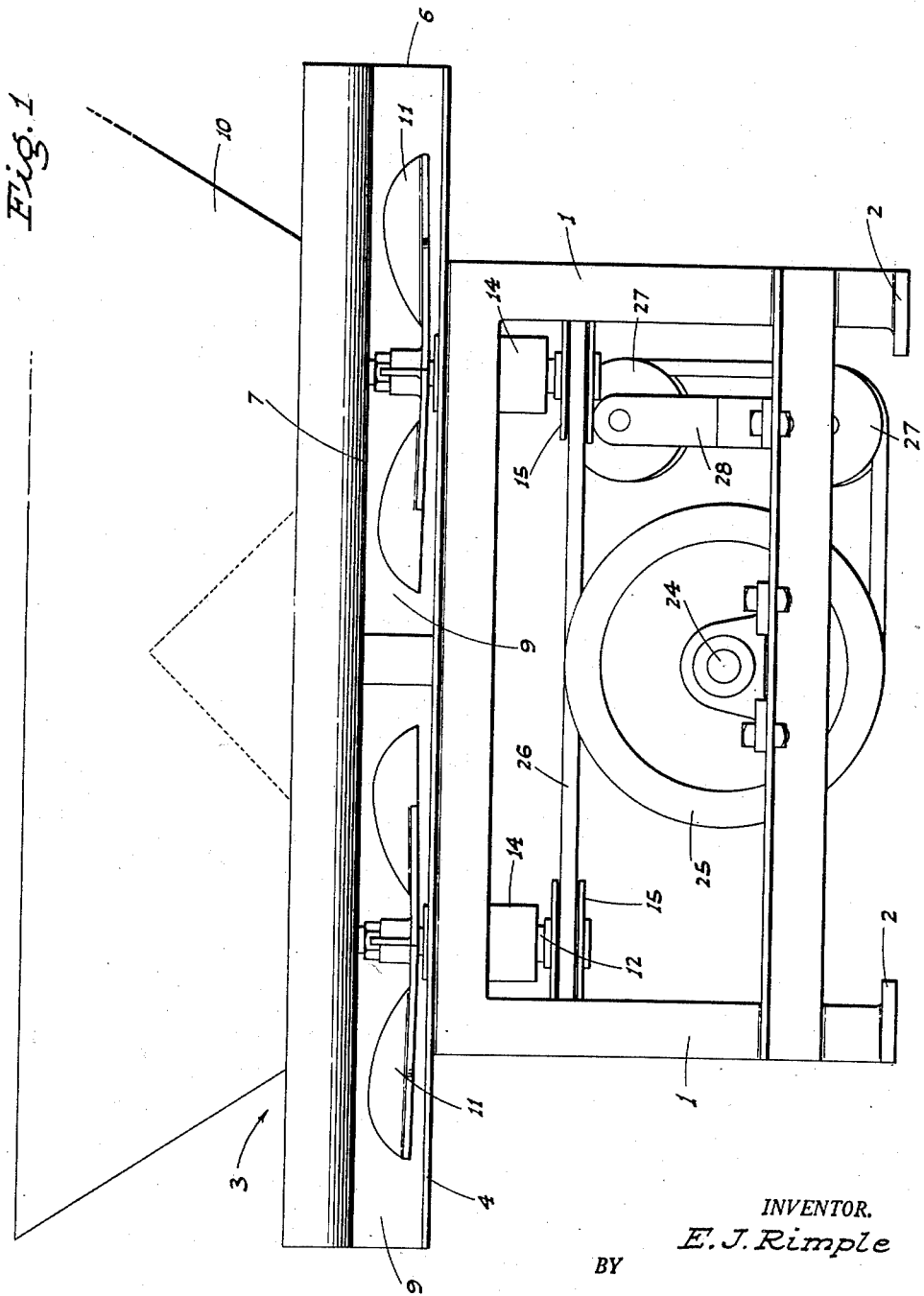
Fig. 1 is a rear end elevation of the improved fertilizer and seed distributor.
Figure 2:
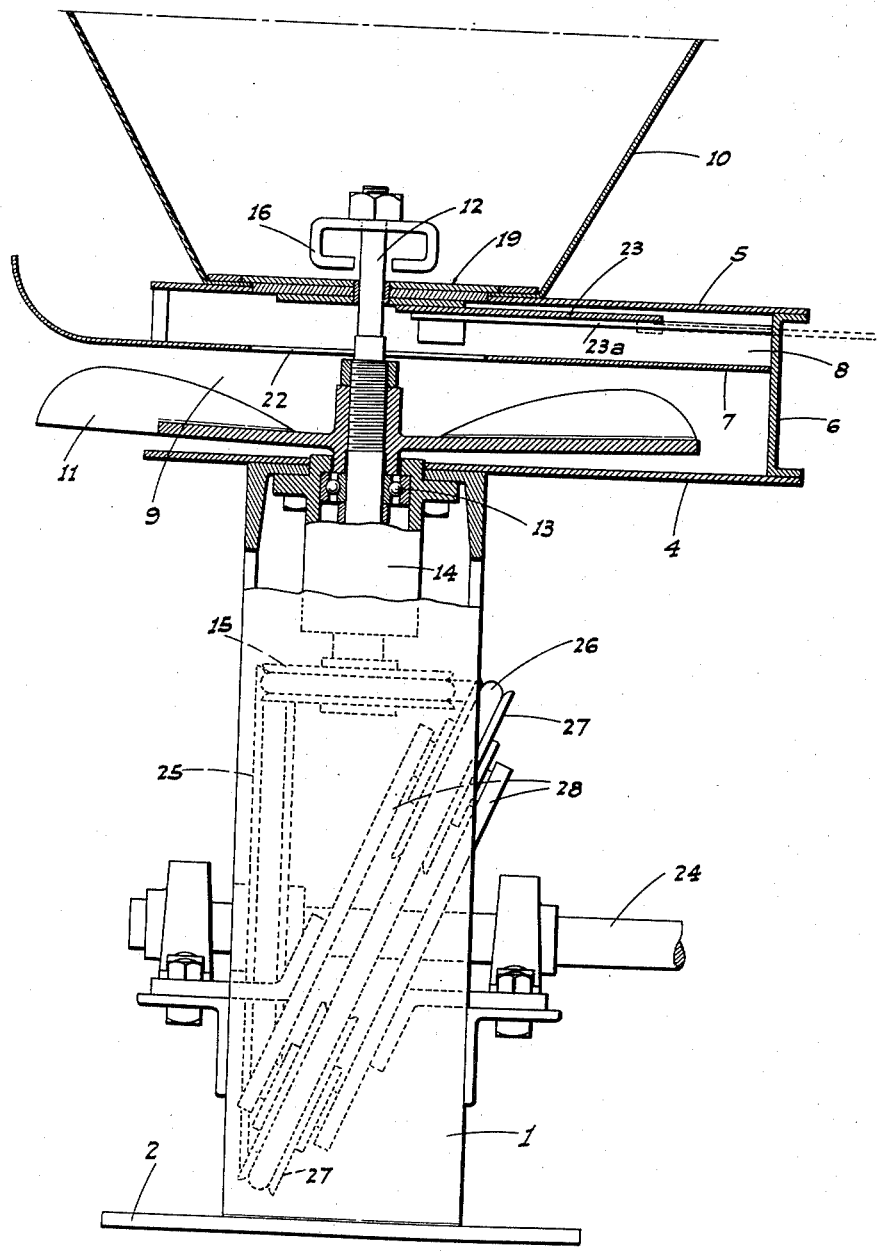
Fig. 2 is an enlarged side elevation, partly in section.

Referring now more particularly to the characters of reference on the drawings, the improved power-actuated fertilizer and seed distributor comprises an open upstanding main frame 1 of generally rectangular configuration formed at the corners with attachment feet 2 whereby said frame may be bolted on the vehicle by means of which the spreader is transported during use.

At the top the main frame 1 supports a hopper and discharge throat assembly, indicated generally at 3, which comprises, in horizontal vertically spaced relation, a bottom plate 4 and a top plate 5 connected together adjacent the front by a front wall 6. Intermediate the bottom and top plates 4 and 5 there is a horizontal intermediate plate 7 which defines between said bottom and top plates an air passage or chamber 8 and a discharge throat 9; said throat being open at the rear end and on opposite sides, as is the air chamber 8. The intermediate plate 7 is upturned at its rear edge to prevent re-entry of the discharged material into the air chamber 8.

The top plate 5 supports a pair of hoppers 10 in transversely spaced relation, corresponding to a pair of vane-type rotary impellers 11 horizontally disposed in transversely spaced relation in the discharge throat 9.

The impellers 11 are each mounted on a spindle 12 which is journaled below the bottom plate 5 by means of bearings 13 in a cage 14. Below the cage 14 each spindle 12 is fitted with a drive pulley 15.

Above the impellers 11 the spindle 12 extends upwardly into the corresponding hopper 10 and is there fitted with a material agitator 16.

The impellers 11 are power actuated, by means hereinafter described in detail, so as to rotate in opposite directions, whereby material, such as commercial fertilizer, or seed, fed from the hoppers 10 into the throat 9, is discharged, both laterally and rearwardly, of the vehicle upon which the device is mounted.

Material flow from each hopper 10 to the corresponding impeller 11 is accomplished by a novel gate unit 17. As both gate units 17 are of identical construction, a description of one will suffice for both.

At the bottom thereof each hopper 10 is formed with a circular opening 18 surrounding the spindle 12, and a rotary plate assembly 19 is mounted in said opening 18 in normally stationary relation.

Rotary adjustment of said plate assembly 19 is accomplished through the medium of a finger-hold 20 on said assembly below the top plate 5.

The rotary plate assembly 19 includes a radially offset feed port 21 therethrough, and turning of said plate assembly by the finger-hold 20 alters the circumferential position of the feed port 21 relative to the corresponding impeller 11. This is important for the reason that with materials of different weights the same must be fed onto the impellers at different circumferential points for most effective distribution.

From each hopper 10 the material delivers downwardly through the corresponding feed port 21 and through a relatively large air and material entry opening 22 in the intermediate plate 7. Air intermixes with the material in chamber 8 and the mixture flows through the opening 22 onto the vaned impeller, whence the material is forcefully dispersed laterally and rearwardly by said impeller.

Figure 3:
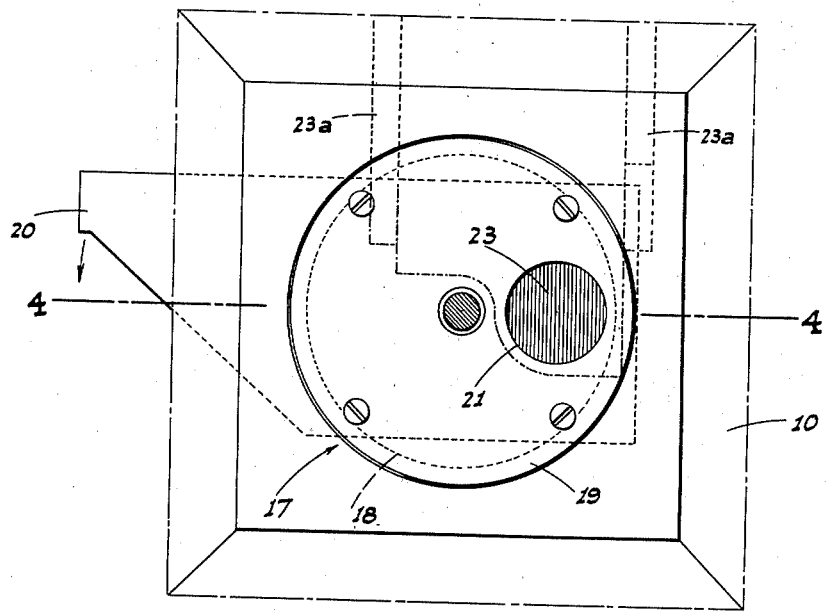
Fig. 3 is a plan view of one hopper and its gate unit.
Figure 4:
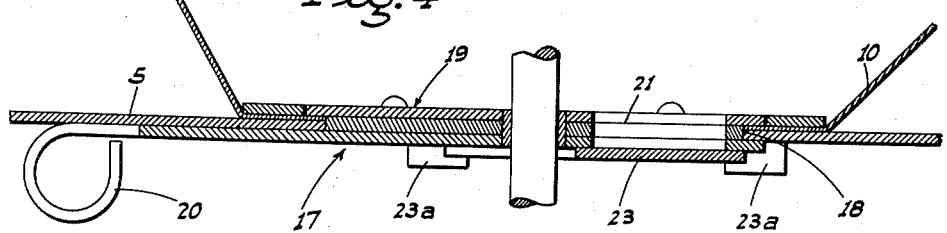
Fig. 4 is an enlarged cross section on line 4—4 of Fig. 3.

The flow of material from hopper 10 downwardly for distribution, as above described, is regulated by a slide gate 23 mounted directly below the rotary plate assembly 19 and carried in guide tracks 23a on the lower side of the top plate 5. The slide gate 23 projects forwardly through the front wall 6 for manual engagement and adjustment, and such gate is of sufficient width and configuration that it registers with the feed port 21 in any intended position of adjustment thereof; i. e. with the feed port 21 in any adjusted position between a point directly to the front of the corresponding spindle 12 or a right-angle position directly to one side of said spindle. In other words, through an arc of adjustment of 90° of the feed port 21, the slide gate 23 remains in register therewith. This is clearly shown in Fig. 3.

The drive mechanism by means of which the impellers 11 are driven in oppositely turning relation comprises the following:

A longitudinal shaft 24 is mounted in the main frame 1 in the lower portion of the latter centrally of its sides, and said shaft is adapted to be driven by any suitable means (not shown) from any power source on the vehicle. The shaft 24 carries a relatively large-diameter pulley 25, over which an endless belt 26, preferably of flexible round type, extends.

Figure 5:
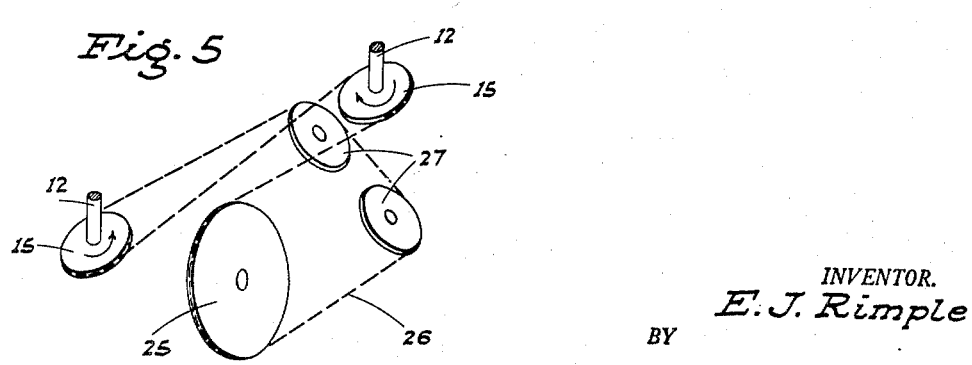
Fig. 5 is a diagrammatic view of the pulley and endless belt unit which drives the impellers.

As shown in Fig. 5, one run of the belt extends from the pulley 25 at the top thereof about one of the spindle drive pulleys 15, and thence extends to and about the other drive pulley 15 in reverse relation. From said other drive pulley 15 the belt runs to and extends about a diagonally mounted change-over pulley unit 27 which includes a diagonal frame 28 fixed in the main frame 1. From the change-over pulley unit 27 the belt 26 extends to the bottom of the relatively large-diameter drive pulley 25.

With the above arrangement the impellers are both driven by a single pulley and endless belt unit, without the runs of the belts intersecting each other in engagement, but with said impellers turning oppositely, as necessary.

With the above described fertilizer and seed distributor, fertilizer, seed or like material is effectively and positively distributed with an even spread; the regulation of each gate unit being accomplished readily by hand to adjust the same to different working conditions and to materials of different weights. The device provides a practical and reliable mechanism for fertilizer and seed distribution, without the need of any complex or cumbersome mechanical structure.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A material distributor comprising an upstanding frame, means on the frame forming a laterally and rearwardly opening discharge throat, a rotary impeller in said throat, a spindle journaled in the frame below the impeller and supporting the latter, means to drive said spindle, a hopper above the throat forming means, and an adjustable gate unit at the bottom of the hopper communicating with said throat; there being means forming an air intake chamber below the gate unit and above said throat, the throat being defined at the top by a plate and said plate having an opening directly below the gate unit.

2. A material distributor comprising an upstanding frame, a vertically spaced bottom plate and top plate mounted on the frame, an intermediate plate mounted between the bottom and top plates whereby to form an air intake chamber above said intermediate plate and a material discharge throat below the same, a hopper mounted on and opening through the top plate, a gate unit at the bottom of the hopper arranged to feed material downward through the air intake chamber, the intermediate plate having an opening therein below said gate unit for air and material flow into the discharge throat, and a power actuated impeller in said throat below said opening in the intermediate plate.

3. A material distributor comprising an upstanding frame, a pair of spaced, partly enclosed impellers, upstanding spindles journaled on the frame and carrying the impellers, means to feed material to the impellers for discharge, and power driven means arranged to drive said spindles simultaneously but in opposite directions; said power driven means including a pulley on each spindle, a main drive pulley mounted on an axis generally horizontally relative to said spindles, and transverse to a line therebetween, an endless belt engaged about the main drive pulley, the belt leading from one side of the main drive pulley to and about one spindle pulley and thence to and about the other spindle pulley in reverse relation, and a diagonally disposed change-over pulley unit cooperating with the belt beyond said other spindle pulley to lead the belt to the other side of the main drive pulley.

4. A material distributor comprising an upstanding rigid frame, three horizontally disposed plates spaced apart vertically and supported by said frame, said plates comprising a top plate, a bottom plate, and an intermediate plate; a front wall closing the space between the plates but leaving the plates open at the sides and rear thereof, a hopper mounted above the top plate, a valve controlled opening between the hopper and the space between the top plate and intermediate plate, an opening between the intermediate plate and the space between the intermediate plate and the bottom plate, such opening being immediately below the opening from the hopper, a vertically disposed spindle disposed co-axially with said openings and projecting into the space between the bottom plate and the intermediate plate, means for rotating the spindle, and an impeller mounted on the spindle and having its major portion disposed within the space between the bottom plate and the intermediate plate.

5. A structure as in claim 4 in which the intermediate plate projects rearwardly beyond the top and bottom plate on an upward curve.

EDWARD J. RIMPLE.

REFERENCES CITED

The following references are of record in the file of this patent:

UNITED STATES PATENTS

| Number | Name | Date |
| --- | --- | --- |
| 280,437 | Armstrong | July 3, 1883 |
| 676,925 | Stevens et al. | June 25, 1901 |
| 922,028 | Parrish | May 18, 1909 |
| 1,619,795 | Roby | Mar. 1, 1927 |
| 2,065,361 | Blake | Dec. 22, 1936 |
| 2,243,996 | Baughman | June 3, 1941 |
| 2,323,262 | Warren | June 29, 1943 |
| 2,334,376 | Bauer | Nov. 16, 1943 |

FOREIGN PATENTS

| Number | Country | Date |
| --- | --- | --- |
| 2,567 | Great Britain | June 26, 1879 |